United States Patent
Powell

(10) Patent No.: US 6,467,468 B1
(45) Date of Patent: Oct. 22, 2002

(54) THROTTLE POSITION SENSOR THAT HEATS THE THROTTLE SHAFT

(75) Inventor: Jeff Powell, Belle River (CA)

(73) Assignee: Siemens VDO Automotive Inc., Auburn Hills, MI (US)

(*) Notice: Subject to any disclaimer, the term of this patent is extended or adjusted under 35 U.S.C. 154(b) by 0 days.

(21) Appl. No.: 09/693,656

(22) Filed: Oct. 20, 2000

Related U.S. Application Data

(60) Provisional application No. 60/162,840, filed on Nov. 1, 1999.

(51) Int. Cl.[7] ............................................. F02N 17/02
(52) U.S. Cl. ................................................. 123/556
(58) Field of Search ............................... 123/549, 557, 123/556

(56) References Cited

U.S. PATENT DOCUMENTS

| | | | | |
|---|---|---|---|---|
| 4,007,720 A | * | 2/1977 | Brettschneider et al. .... | 123/549 |
| 4,276,864 A | * | 7/1981 | Waschkuttis ................. | 123/557 |
| 4,379,770 A | * | 4/1983 | Bianchi et al. ............. | 123/549 |
| 4,671,245 A | * | 6/1987 | Knapp ......................... | 123/549 |
| 4,922,882 A | * | 5/1990 | Topfer ......................... | 123/556 |
| 5,209,211 A | * | 5/1993 | Kopp et al. ................. | 123/549 |
| 5,347,966 A | * | 9/1994 | Mahon et al. ......... | 123/179.21 |
| 5,680,850 A | | 10/1997 | Buchi | |

FOREIGN PATENT DOCUMENTS

| | | |
|---|---|---|
| GB | 2037894 A | 7/1980 |
| JP | 63134826 | 7/1988 |
| JP | 03078537 | 3/1991 |

* cited by examiner

Primary Examiner—Marguerite McMahon

(57) ABSTRACT

The air intake system of the vehicle engine includes a flow body that allows for the flow of air through a flow passage to the vehicle engine. A throttle valve disposed in this passage controls the amount of air flowing to the vehicle engine. To avoid freezing a heating element is provided. The valve is heated by the heating element, which is preferably positioned in proximity to the throttle valve,. and in the same housing for a position sensor for the valve.

5 Claims, 2 Drawing Sheets

THROTTLE POSITION SENSOR THAT HEATS THE THROTTLE SHAFT

This application claims priority to Provisional Patent Application Ser. No. 60/162,840, filed Nov. 1, 1999.

BACKGROUND OF THE INVENTION

This invention:relates to a manner for heating a valve contained within an air intake system for a vehicle.

An air intake system provides clean air to engine cylinders of a vehicle. Such a system includes an intake opening that allows air to flow through a flow passage into a manifold, which then distributes air to the engine cylinders. Typically, a throttle valve controls the flow of air in the flow passage through the opening and closing of a throttle blade. A position sensor interconnects with this throttle blade to detect its rotational position within the flow passage. This position sensor is typically contained in a housing.

At times, the throttle valve may freeze in an undesirable position or otherwise operate in less than an optimal manner due to a combination of ambient moisture and low temperature. This condition could interfere with the proper operation of the vehicle engine and reduce its performance. Accordingly, it is desirable to provide a way to heat the throttle valve within the air intake system.

SUMMARY OF THE INVENTION

In a disclosed embodiment of this invention, the air intake system of the vehicle engine includes a flow body that allows for the flow of air through a flow passage to the vehicle engine. A throttle valve disposed in this passage controls the amount of air transmitted to the vehicle engine. Supporting this throttle valve within the passage is a shaft for driving the throttle valve within the flow passage. To avoid a freezing condition caused by ambient moisture and low temperature, the shaft is positioned adjacent to a heating element, which, when activated, heats the shaft, thereby heating the throttle valve.

The throttle shaft is also provided with a position sensor to provide feedback of the position of the blade of the throttle valve. The position sensor is preferably mounted adjacent one end of the throttle shaft in a housing. The heating element is preferably mounted in this housing. More preferably, the heating element is coiled around the shaft within this housing for the position sensor.

These and other features of the present invention can be best understood from the following specification and drawings, the following of which is a brief description.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
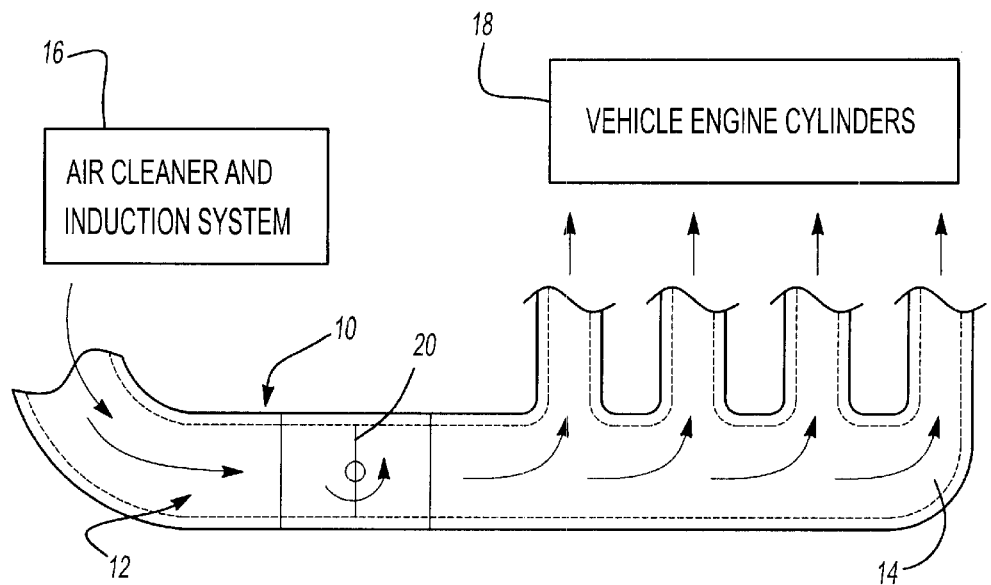
FIG. 1 shows a throttle valve in a flow body, including a flow passage.

FIG. 1 presents a view of the invention in its environment. Flow body 10 with a flow passage 12, and intake manifold 14 are shown. Air flows from an air cleaner and induction system 16 through flow passage 12 to intake manifold 14, which then distributes the air to cylinders of a vehicle engine 18. Throttle valve 20 is disposed within the flow passage 12 and opens and closes to regulate the flow of air through the air supply system.

Figure 2:
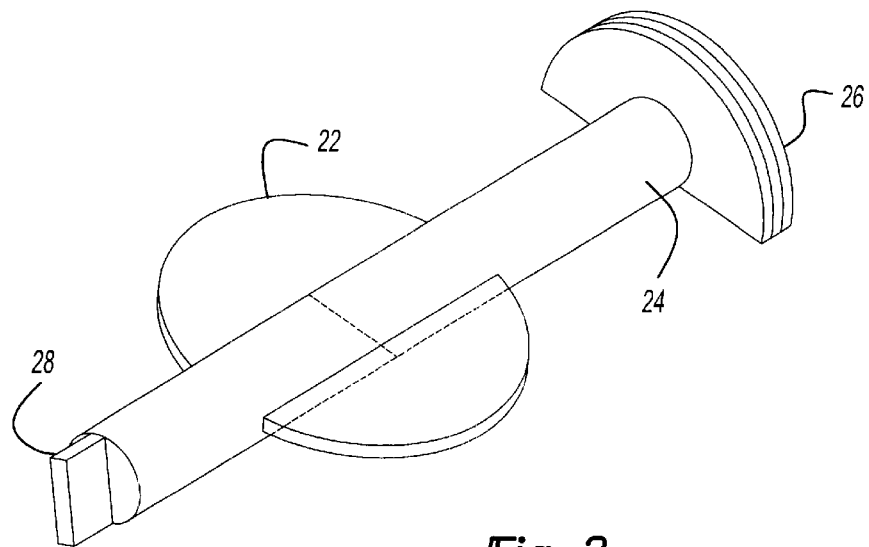
FIG. 2 shows a more detailed view of the throttle valve of FIG. 1, including a throttle blade and shaft.

FIG. 2 shows throttle valve 20, including throttle blade 22 and shaft 24. Throttle blade 22 is fastened to shaft 24, which itself may be fastened to actuation paddle 26. When actuation paddle 26 rotates, it simultaneously rotates shaft 24 and throttle blade 22 to control airflow. As known, same drive system drives paddle 26 to control air flow to a desired amount. At the end of shaft 24 is end-detail 28, which then engages a position sensor, as described below. The position sensor provides feedback to the drive system for the actuation paddle 26. The foregoing describes throttle valves generally known in the art.

Figure 3A:
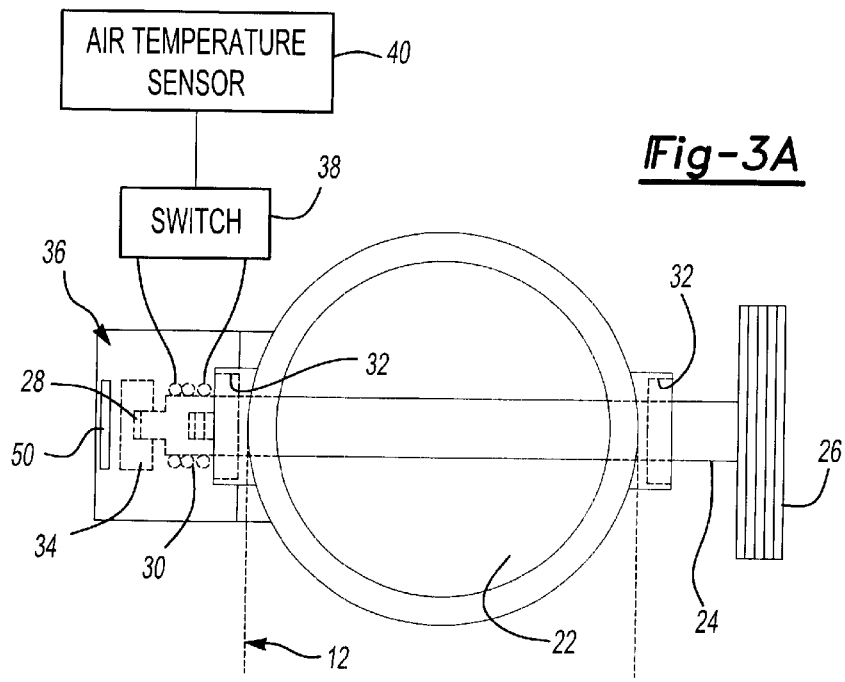
FIG. 3A shows an embodiment of the throttle valve of FIG. 1 in relation to the heating element used in conjunction with a switch and air temperature sensor.

FIG. 3A shows the invention in detail. Throttle blade 22 and shaft 24 are positioned adjacent to heating element 30. Bearings 32 mount actuation paddle 26, shaft 24, and throttle blade 22 for rotation. Position sensor 34 and housing 36 are positioned at end-detail 28. Heating element 30 is coiled around the end of the shaft 24. Heating element 30 is disposed in housing 36 for position sensor 34. Position sensor 34 rotates with end-detail 28 and relative to a control 50 in housing 36 to provide feedback of throttle valve position. Heating element 30 is connected to switch 38, which communicates with air temperature sensor 40 to activate switch 38 at a predetermined temperature. That is, if freezing is a concern based upon ambient temperature the switch is activated.

Figure 3B:
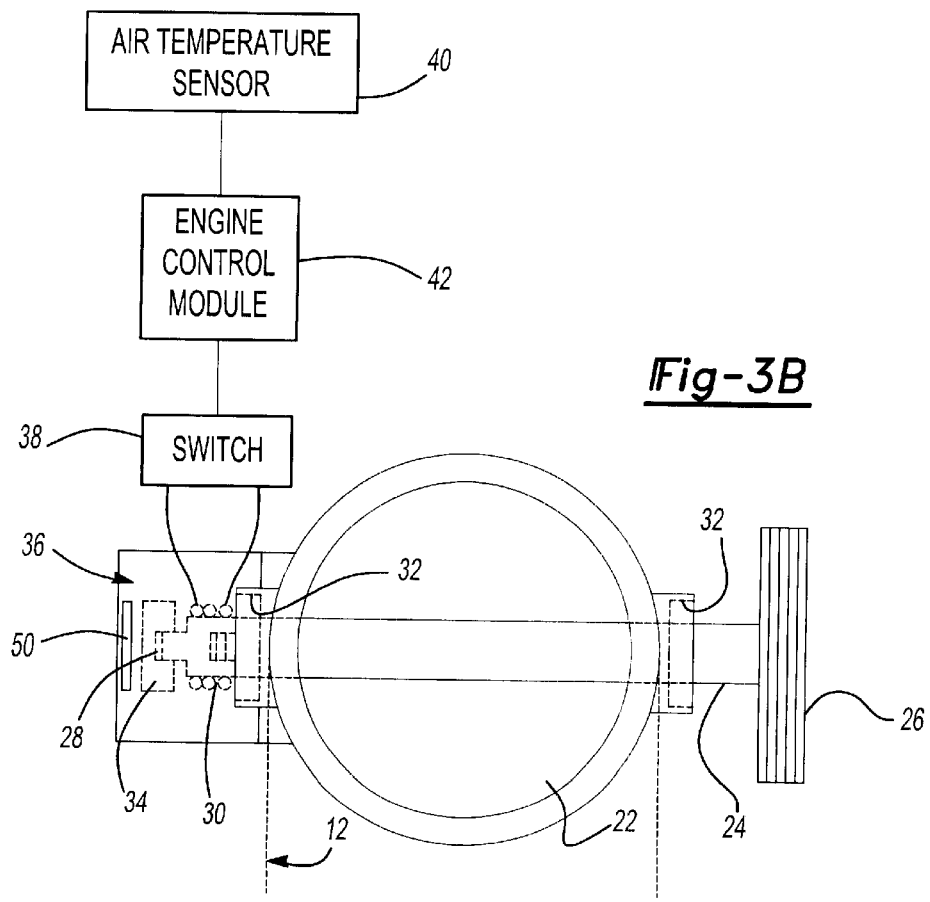
FIG. 3B shows an embodiment of the throttle valve of FIG. 1 with a heating element used in conjunction with a switch, engine control module, and air temperature sensor.

As shown in FIG. 3B, another embodiment of the invention allows heating element 30 to communicate with engine control module 42 that controls the operation of switch 38 based on air temperature measured by the air temperature sensor 40.

In either instance, when heating element 30 is activated, it heats shaft 24, which then heats blade 22 and thereby prevents freezing of blade 22. Further, the placement of heating element 30 in housing 36 reduces the amount of space required for the invention. Further, the centralization of the electrical elements of both position sensor 34 and heating element 30 provides for more efficient production.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air supply system for a vehicle engine comprising:
   a flow body including a flow passage for communicating a source of air to a vehicle engine;
   a throttle valve disposed in said flow body for controlling the flow of air; and a shaft wherein said heating element surrounds a shaft in contact with said throttle valve.

2. An air supply system as set forth in claim 1 wherein said heating element is activated by a switch.

3. An assembly as set forth in claim 1, wherein said shaft interconnects with a position sensor in a housing, and said heating element is mounted in said housing.

4. An air supply system for a vehicle comprising:

a flow body including a flow passage for communicating a source of air to a vehicle engine;

a throttle blade disposed in said flow body for controlling the flow of air;

a shaft in contact with said throttle blade supporting said throttle blade in said flow body;

a heating element surrounding said shaft for conducting heat to said throttle blade through said shaft;

a switch for activating said heating element, and communicating with an air temperature sensor, for activating said switch when a predetermined temperature is sensed; and a position sensor interconnected with said shaft for detecting its rotational position.

5. An assembly asset forth in claim 4, wherein said heating element is disposed in a housing for said position sensor.

* * * * *